US006241161B1

(12) United States Patent
Corbett

(10) Patent No.: US 6,241,161 B1
(45) Date of Patent: Jun. 5, 2001

(54) HUNTING SCENT CONTAINER

(76) Inventor: Timothy W. Corbett, 471 Morris St., Fond du Lac, WI (US) 54935

( * ) Notice: Subject to any disclaimer, the term of this patent is extended or adjusted under 35 U.S.C. 154(b) by 0 days.

(21) Appl. No.: 09/443,280

(22) Filed: Nov. 19, 1999

Related U.S. Application Data

(60) Provisional application No. 60/152,928, filed on Sep. 9, 1999.

(51) Int. Cl.[7] ...................................................... A24F 25/00
(52) U.S. Cl. ................................ 239/58; 239/57; 239/55; 222/187
(58) Field of Search ................................. 239/58, 57, 55, 239/44, 46, 36, 145; 222/187; 285/921; 403/326, 327, 321

(56) References Cited

U.S. PATENT DOCUMENTS

| D. 228,911 | 10/1973 | Gatter . | |
|---|---|---|---|
| D. 268,695 | 4/1983 | Kolf . | |
| D. 301,912 | 6/1989 | Ward . | |
| 2,738,224 | * 3/1956 | Turner et al. | 239/57 |
| 2,763,395 | * 9/1956 | Meek | 239/58 |
| 3,046,192 | 7/1962 | Bilyeu . | |
| 3,515,302 | * 6/1970 | Curran | 239/57 |
| 3,667,785 | * 6/1972 | Kapeker | 285/921 |
| 3,770,199 | * 11/1973 | Hoek et al. | 239/54 |
| 4,523,870 | * 6/1985 | Spector | 239/55 |
| 5,161,646 | 11/1992 | Aurich et al. . | |
| 5,263,274 | 11/1993 | Speed . | |
| 5,307,584 | 5/1994 | Jarvis . | |
| 5,465,521 | 11/1995 | Baker et al. . | |
| 5,544,812 | * 8/1996 | Torres | 239/55 |
| 5,622,314 | 4/1997 | Eason . | |
| 5,746,019 | 5/1998 | Fisher . | |
| 5,832,648 | 11/1998 | Malone . | |

FOREIGN PATENT DOCUMENTS

| 0 294 175 | 12/1988 | (EP) . |
| 744369 | 2/1956 | (GB) . |
| 2 251 601 | 7/1992 | (GB) . |
| WO 90/07430 | 7/1990 | (WO) . |

* cited by examiner

Primary Examiner—David A. Scherbel
Assistant Examiner—Dinh Q. Nguyen
(74) Attorney, Agent, or Firm—Richard C. Litman

(57) ABSTRACT

A compact, extensible scent dispensing device adapted for being placed in a closed position, in an extended position, and in a disassembled position. The device is preferably used by a hunter for attracting a game animal. The device comprises an elongated housing, an inner tube, a string, and a clip. The housing is dimensioned and configured for receiving the inner tube. The housing is adapted for receiving a predetermined volume of scented fluid and for being partially inserted into the ground. The inner tube is dimensioned and configured to fit within the housing and to receive a wick member. The inner tube has a hollow body with elongated slots and a cap. The string is attached to the cap and can be configured to form a loop so that the device can be hung from an upright structure and permit the scent to be more easily dispensed to the atmosphere. The clip is attached to the string, and is adapted for attaching to the upright structure and to a clothing member being worn by the user.

9 Claims, 5 Drawing Sheets

HUNTING SCENT CONTAINER

CROSS-REFERENCE TO RELATED APPLICATION

This application claims the benefit of U.S. Provisional Patent Application Ser. No. 60/152,928, filed Sep. 9, 1999.

BACKGROUND OF THE INVENTION

1. Field of the Invention

The present invention relates generally to scent dispensers. More specifically, the invention is a compact, extensible scent dispensing device for hunters which is adapted for being placed in a closed position, in an extended position, and in a disassembled position in order to dispense a scent for attracting game animals, or for masking human scent.

2. Description of Related Art

Many hunters own, or would like to own, a scent dispensing device. Many hunters also would like to own a scent dispensing device which is compact, easily transportable, and adaptable to be attached to an upright structure or to be inserted into the ground. However, most scent dispensing devices may not be compact and easily transportable, nor adaptable to be inserted into the ground. A scent dispensing device which is both compact and extensible would therefore be desirable. A scent dispensing device which is easily transportable and adaptable to be inserted into the ground would further be desirable. The present invention achieves these goals through a compact, extensible scent dispensing device with an elongated housing, an elongated inner tube, a string, and a clip.

Various forms of scent dispensing devices are known. U.S. Design Pat. No. 228,911 issued on Oct. 30, 1973, to Adelaide L. Gatter describes an insect repellant container or similar article in the shape of a four-sided elongated rectangular box with a plurality of openings along at least two of the sides. U.S. Design Pat. No. 268,695 issued on Apr. 19, 1983, to John W. Kolf describes a deer scent dispenser with two flat surfaces with a scented fluffy material in front and two apertures for attachment by a strap. U.S. Design Pat. No. 301,912 issued on Jun. 27, 1989, to Lynwood W. Ward describes a deer scent holder in the shape of a capped tube with the cap having an aperture for attachment to a strap. U.S. Pat. No. 3,046,192 issued on Jul. 24, 1962, to Archie E. Bilyeu describes heated compositions of scents contained in an open fuel case covered by a cloth cover for attracting wild game and the method for their use by heating. U.S. Pat. No. 5,161,646 issued on Nov. 10, 1992, to Charles C. Aurich, et al. describes a device for dispensing animal attractant scents having a case in which are housed a power source and a bottle containing a supply of liquid animal attractant scent. The power source heats a wick containing a heat generating resistor. U.S. Pat. No. 5,263,274 issued on Nov. 23, 1993, to Kenneth D. Speed describes a game luring scent diffusing device that includes a supply container and a collection container suspended from the supply container by an elongated porous wick extending between the containers. U.S. Pat. No. 5,307,584 issued on May 3, 1994, to Robert Jarvis describes a deer scent dispenser comprising a cylindrical container that is provided with a bottom reservoir for liquid deer scent. The container has plastic screen walls which contain a wick.

U.S. Pat. No. 5,465,521 issued on Nov. 14, 1995, to Jeffrey L. Baker et al. describes a device including a plurality of scent cartridges stored within a container sealed by a cap. The cap includes a depending hook for extracting an individual scent cartridge from the container. U.S. Pat. No. 5,622,314 issued on Apr. 22, 1997, to Donald J. Eason describes a game scent diffusion device in the shape of an inverted T-shaped member adapted to be disposed in a bottle of liquid game scent and exposed when the bottle is hung from a tree. U.S. Pat. No. 5,746,019 issued on May 5, 1998, to Jeffrey J. Fisher describes a hunter's scenting system having a frangible vial containing scented liquid disposed within a flexible sheath member and having a wick member with a first end disposed adjacent to the vial and a second end extending below the sheath member. U.S. Pat. No. 5,832,648 issued on Nov. 10, 1998, to Richard E. Malone describes a jar-like container having a scented liquid therein and a ringed cap with an attachment of a plurality of elongated members that are configured to retain the container thereon when the cap is removed from the opening of the container. This arrangement permits the container to be suspended below the cap and a wick that is also attached to the cap to be in communication with air currents flowing over the wick.

United Kingdom Patent No. 744,369 published on Feb. 8, 1956, for Hugh W. B. Baker describes vaporizing attachments for bottles or like containers for liquids. Each attachment comprises a cap for the bottle and a wick support attachable to the cap so that the cap can be detached from the bottle and lifted to raise and expose a desired portion of the wick, whereby the liquid contents of the bottle can be vaporized. United Kingdom Patent No. 2,251,601 published on Jul. 15, 1992, for George M. Mowbray describes a disposable scent holder for an automobile window comprising two sheets of transparent plastic material sealed together to define a volume for scent. European Patent No. 294,175 published on Dec. 7, 1988 for John M. Cook describes a plate-like carrier having a surface to which a hollow tube containing a scent package can be affixed, and with the longitudinal axis of the tube being substantially parallel to the surface of the carrier. PCT Patent No. WO 90/07430, published on Jul. 12, 1990, for Aubrey W. Richardson describes a dispenser for dispensing a liquid including an elongated case having a body and a cap which includes a clip for carrying the dispenser in a shirt pocket. The case includes a reservoir for holding cologne or the like and a roller-ball applicator.

None of the above inventions and patents, taken either singly or in combination, is seen to describe the instant invention as claimed.

SUMMARY OF THE INVENTION

The present invention is directed to a compact, extensible scent dispensing device adapted for being placeable in a closed position, in an extended position, and in a disassembled position. The device is preferably to be used by a hunter for attracting a game animal, or for dispensing a scent to mask the hunter's human scent. The device comprises an elongated housing, an elongated inner tube, a string, and a clip.

The housing is dimensioned and configured for receiving the inner tube. The housing is adapted for receiving a predetermined volume of scented fluid, and for releasably engaging the inner tube when it is desired that the device be placed in the closed position. The housing has a generally cylindrical shape, one end being open for receiving the inner tube, and the other end being closed with a conically shaped end adapted for penetrating the ground. The housing has a spaced apart pair of annular lips disposed on its inner surface which coact with a flange on the base of the inner tube in order to support the inner tube in an extended position.

The inner tube is dimensioned and configured to fit within the housing, and to receive a wick member. The inner tube has a hollow body with elongated slots, a cap, and a generally cylindrical shape. The slots in the body expose the wick member such that a sufficient amount of scent can be dispensed for eventual evaporation into the atmosphere when the device is placed in the extended position or in the disassembled position. The cap is configured in a shape of a handle such that the user can position the device in any of the three aforementioned positions. The cap releasably secures the inner tube to the housing and forms an air tight seal for storage and portage.

The string is attached to the cap and can be manipulated to form a loop so that the device can be hung from an upright structure, such as a tree branch. The clip is attached to the string, and is adapted for attaching to a tree branch or to a hunter's clothing.

Accordingly, it is a principal object of the invention to provide a scent dispensing device which is capable of dispensing a sufficient amount of scent.

It is another object of the invention to provide a scent dispensing device which is capable of being readily adjustable between a closed position, an extended position, and a disassembled position.

It is a further object of the invention to provide a scent dispensing device which is capable of being suspended from a tree branch, pinned to a hunter's clothing or being mounted in the ground.

Still another object of the invention is to provide a scent dispensing device which has a compact, air tight housing for convenient transport in a pocket of the hunter's clothing.

It is an object of the invention to provide improved elements and arrangements thereof in a device for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 2:
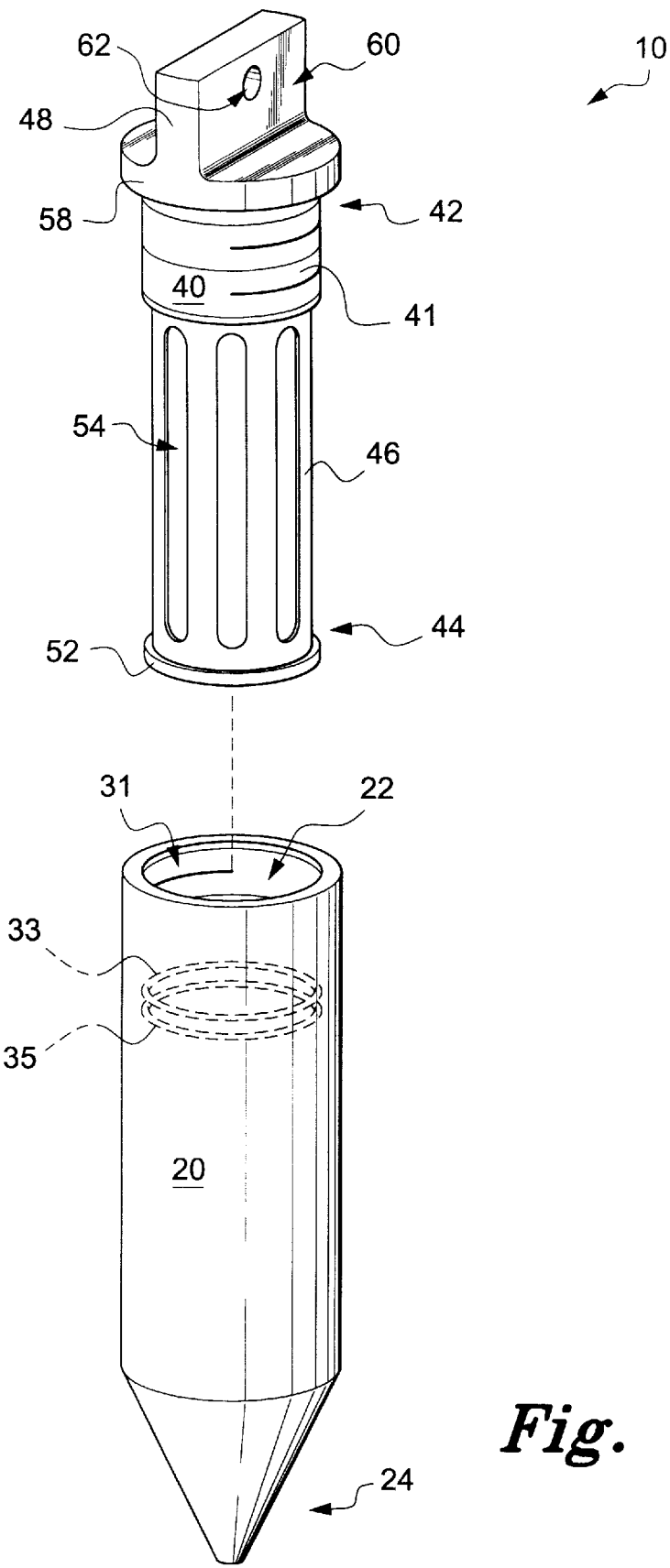
FIG. 2 is an exploded, perspective view of the device according to the present invention, the wick being omitted.
Figure 3:
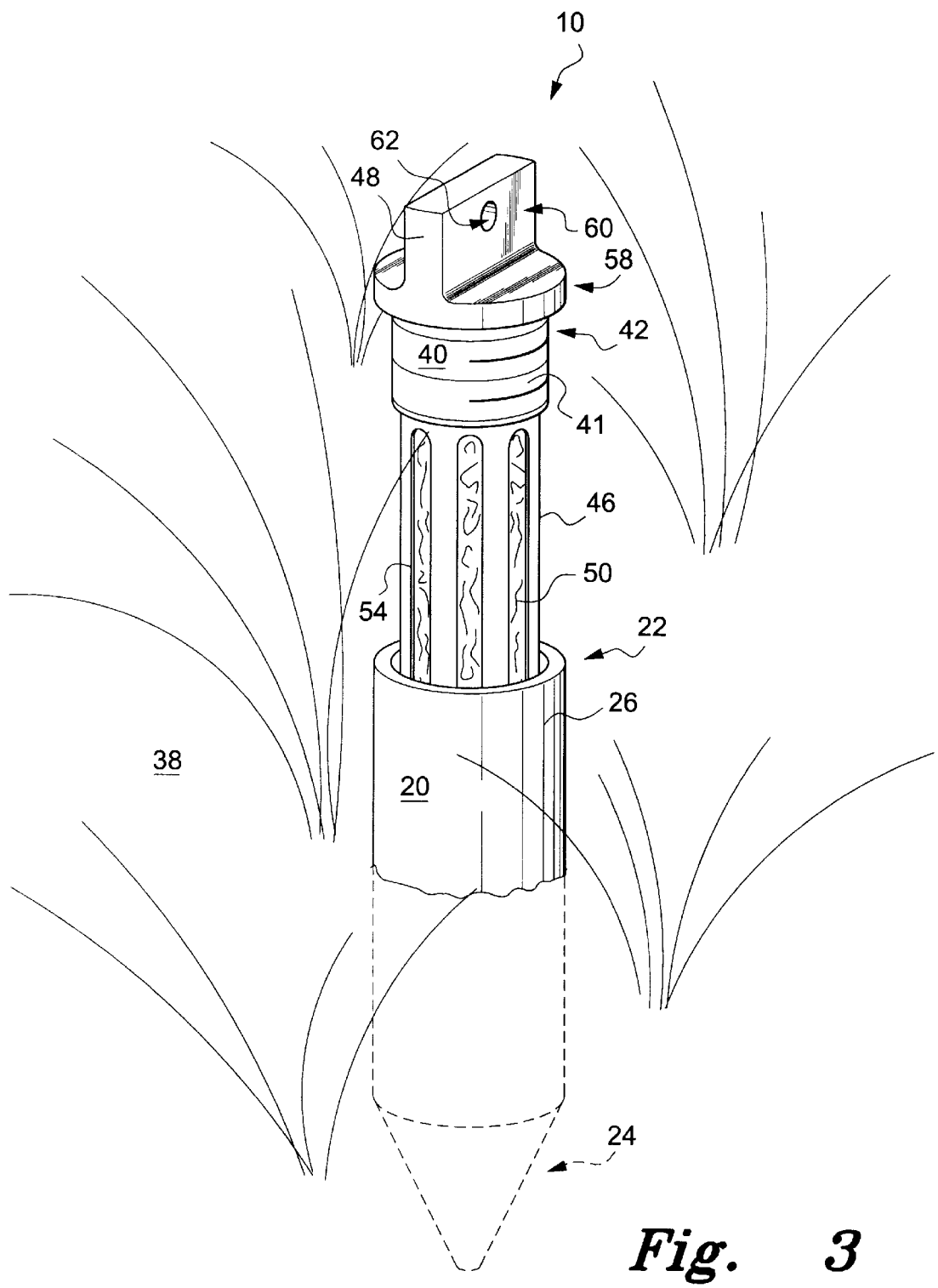
FIG. 3 is an environmental, perspective view of the device, in the extended position and being partially positioned in the ground, according to the present invention.
Figure 4:
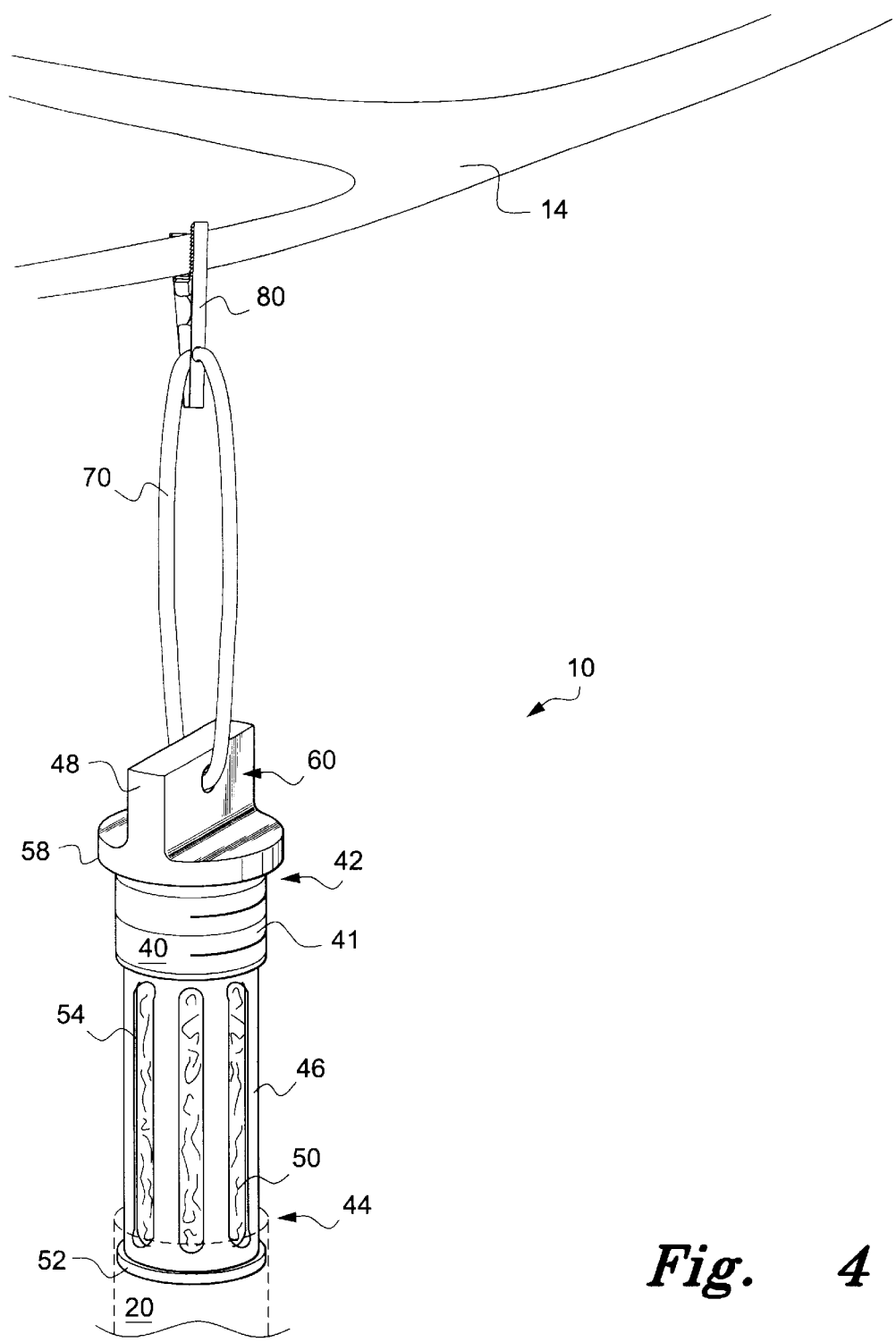
FIG. 4 is an environmental, perspective view of the device, in the disassembled position and being attached to a tree limb, according to the present invention.
Figure 5:
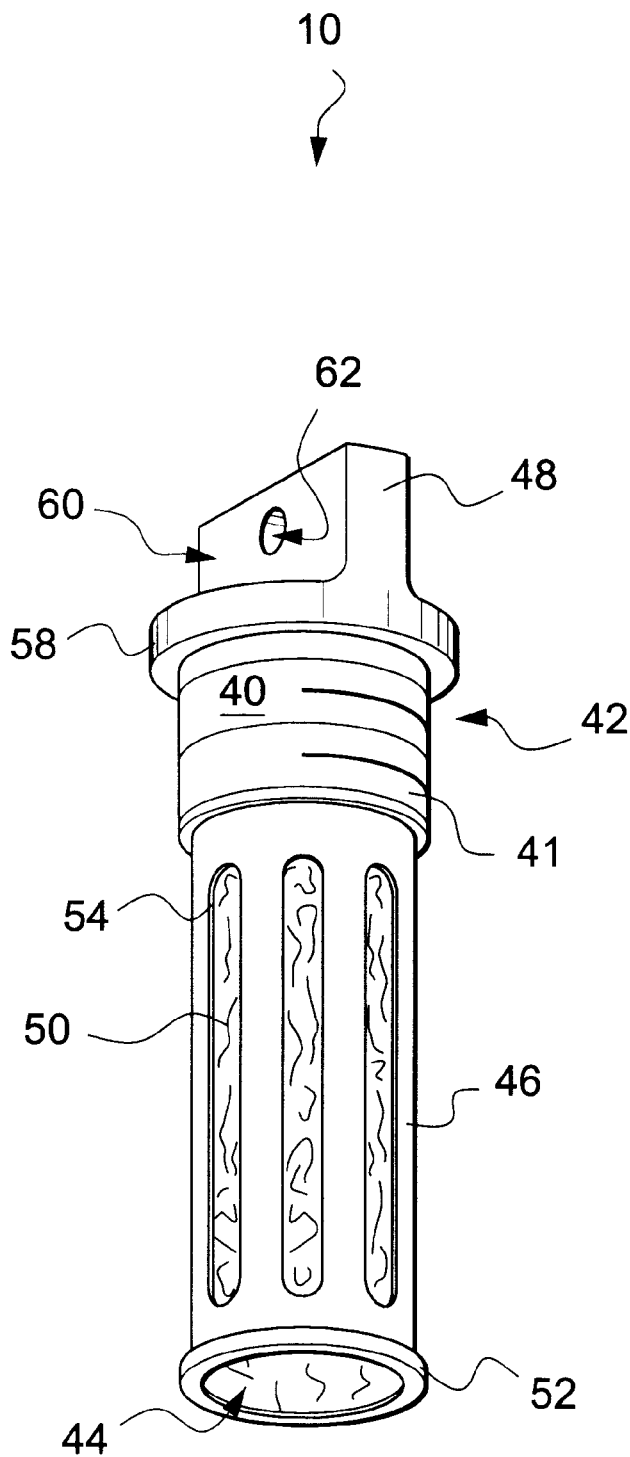
FIG. 5 is a perspective view of the inner tube with the string and clip being omitted.

Referring to FIGS. 1–5, the present invention is directed to a compact, extensible scent dispensing device 10 adapted for being placed in a closed position (FIG. 1), in an extended position (FIG. 3), and in a disassembled position (FIG. 4). The device 10 is preferably to be used by a hunter for attracting a game animal, such as a deer, a moose, and any other game animal. Alternatively, the device 10 can be used for a variety of other purposes, such as an air freshener and an insect repellant with the proper chemical ingredient. The device 10 comprises an elongated housing 20, an elongated inner tube 40, a first attaching means, and a second attaching means.

Figure 1:
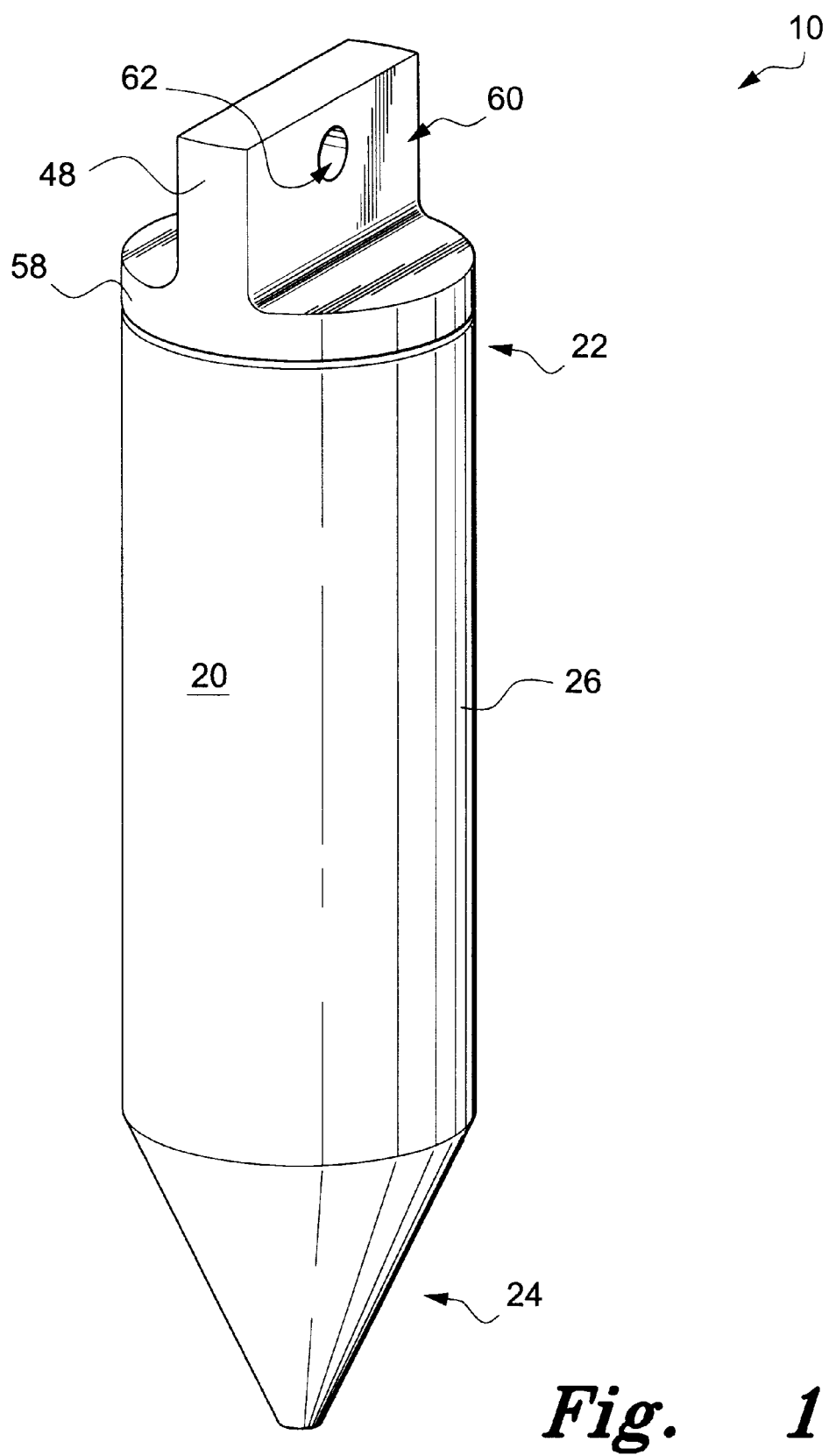
FIG. 1 is a perspective view of a compact extensible scent dispensing device, in the closed position, according to the present invention.

As shown in FIGS. 1–3, the housing 20 is an elongated, hollow body 26 having an open first end 22 and a closed second end 24. The housing 20 is adapted for receiving a predetermined volume of scented fluid (not shown), such as urine of the game animal, pheromones of the game animal, and any other well known scented fluid in the art. The first end 22 of the housing 20 is equipped with means for releasably engaging the inner tube 40. In the preferred embodiment, the first end 22 of the housing 20 has internal threading 31 about the opening (FIG. 2) so that the housing 20 can engage with the inner tube 40 when it is desired that the device 10 be placed in a closed position. The second end 24 of the housing 20 is shaped conically in order that the device 10 can be partially inserted into the ground 12 (FIG. 3) when there is no upright structure, such as a tree limb 14 (FIG. 4), a shrub or the like, for the attachment of the device 10. As shown in FIG. 2, the housing 20 has a spaced apart pair of internal annular lips 33 and 35 disposed at the first end 22 below the threads 31. The function of these lips 33, 35 will be discussed below.

As shown in FIGS. 2–5, the inner tube 40 has a closed first end 42, an open second end 44, an elongated hollow body 46, and a cap 48. The inner tube 40 is dimensioned and configured to fit within the housing 20, and to receive means 50 for releasing a scent (FIGS. 3–5), such as a wick member, sponge, gel member, cloth member, cotton member, and any other well known means in the art. The first end 42 of the inner tube 40 has external threading 41 (FIGS. 2–5) in order that the first end 42 of the inner tube 40 can releasably engage the internal threads 31 of the first end 22 of the housing 20, so that in the closed position the body 46 of the inner tube 40 is enclosed in the housing 20.

The second end 44 of the inner tube 40 has an external annular flange 52 (FIGS. 2, 4, and 5), which projects outwardly from the second end 44 of the inner tube 40. The inner tube 40 and the housing 20 are preferably made from a thermoplastic material, such as polyethylene or polypropylene, The housing 20 is sufficiently flexible and the tolerance between the flange 52 and the annular lips 33 and 35 are so designed that when the inner tube 40 is slidably removed from the housing 20, the flange 52 snaps over the lower annular lip 35 and is temporarily retained in the space between the annular lips 33 and 35. Additional force is required to withdraw the flange 52 past the upper lip 33. In this manner, the lower annular lip 35 may support the inner tube 40 in an extended position, so that the housing 20 can be inserted into the ground 38, while the inner tube 40 projects above ground 38 in order to dispense scent to the atmosphere, as shown in FIG. 3.

The body 46 of the inner tube 40 extends between the first and second ends 42, 44 of the inner tube 40. The body 46 of the inner tube 40 has a generally cylindrical shape and a plurality of elongated slots 54 (FIGS. 2–5) positioned at predetermined locations along the body 46 of the inner tube 40. The slots 54 expose the means 50 for releasing a scent when the means 50 for releasing a scent is inserted into and positioned within the inner tube 40 such that a sufficient amount of scented fluid can be dispensed for eventual evaporation into the atmosphere when the device 10 is placed in the extended position (FIG. 3) or in the disassembled position (FIG. 4). As an alternative, an array of circular orifices can be formed in the tube 40 instead of slots 54 for dispersing the scent.

The cap 48 ensures an airtight and fluid tight seal when the inner tube 40 is threaded into the housing 20. The cap 48 has a cylindrical base 58 which is flush with the housing 20 when the device 10 is in the closed position, as shown in FIG. 1. A generally rectangular tab 60 is disposed perpendicular to the cylindrical base 58. The user can position two fingers on opposite sides of the tab 60 to apply sufficient torque and/or gripping pressure on the tab 60 so that the device 10 can be placed in any of the three positions. The tab 60 has an eyelet 62 defined therein which is dimensioned for receiving and permitting the first attaching means, such as a string 70, a wire, and any other well known attaching means, to pass through the eyelet 62.

As shown in FIG. 4, the first attaching means or string 70 can be configured to form a loop so that the device 10 can be deployed and hung from the upright structure. When the device 10 is deployed and hung from the upright structure and is in the extended deployed and hung from the upright structure and is in the extended position (housing 20 shown in shadow) or in the disassembled position with the housing 20 removed), the device 10 is generally more effective in attracting the game animal since the scented fluid is released to the atmosphere and is carried a further distance by passing air currents.

As shown in FIG. 4, a second attaching means 80 be attached to the first attaching means 70, and is also adapted for attaching the device 10 to an upright structure such as a tree branch 14. The second attaching means 80 is also adapted for attaching to a clothing member, such as a hunting uniform, a shirt, a pant, and the like, that is being worn by the user. The second attaching means can be an alligator clip 80 or the like.

A preferred method of using the device 10, which is to be attached to an upright structure, is embodied in the following steps:
(a) saturating a scent means 50 for releasing a scent with a sufficient volume of the scented fluid;
(b) inserting the scent means 50 for releasing a scent into the body 46 of the inner tube 40;
(c) inserting the inner tube 40 into the housing 20 until a substantial portion of the inner tube 40 resides within the housing 20;
(d) applying a sufficient torque upon the cap 48 in a clockwise direction until the device 10 is placed in the closed position;
(e) transporting the device 10 to a desired destination;
(f) applying a sufficient torque upon the cap 48 in a counterclockwise direction until the first end 42 of the inner tube 40 is disengaged from the first end 22 of the housing 20;
(g) applying a sufficient pressure upon the cap 48 in a direction directed away from the second end 24 of the housing 10 until the device 10 is placed in the disassembled position; and
(h) attaching the inner tube 40 to an upright structure.

A preferred method of using the device 10, which is to be partially inserted into the ground 12, is embodied in the following steps:
(a) saturating the scent means 50 for releasing a scent with a sufficient volume of the scented fluid;
(b) inserting the scent means 50 for releasing a scent into the body 46 of the inner tube 40;
(c) inserting the inner tube 40 into the housing 20 until a substantial portion of the inner tube 40 resides within the housing 20;
(d) applying a sufficient torque upon the cap 48 in a clockwise direction until the device 10 is placed in the closed position;
(e) transporting the device 10 to a desired destination;
(f) partially inserting conical tip 24 of the device 10 into the ground 12;
(g) applying a sufficient torque upon the cap 48 in a counterclockwise direction until the inner tube 40 is disengaged from the first end 22 of the housing 20;
(h) applying a sufficient pressure upon the cap 48 in a direction directed away from the second end 24 of the housing 10 until the device 10 is placed in the extended position.

The housing 20 and the inner tube 40 are preferably made of a lightweight, resilient, plastic material that does not absorb the scented fluid, or can be made of any other well known material in the art. It is preferred that the housing 20 has more rigidity than the inner tube 40 since the housing 20 may have to enclose and contain a predetermined volume of the scented fluid therein and is the part of the device 10 that is inserted into the ground 12. The scented fluid can be a natural product or a synthetic product. The wick member can be made of cotton fibers, polyester fibers, gauze material and the like material.

It is to be understood that the present invention is not limited to the sole embodiment described above, but encompasses any and all embodiments within the scope of the following claims.

I claim:

1. A compact, extensible scent dispensing device adapted for being placed in a closed position, in an extended position, and in a disassembled position, said device comprising:

a housing having an open first end, a closed second end, a hollow body, and an inner surface having a spaced apart pair of annular lips disposed thereon adjacent the first end;

an inner tube having a closed first end, an open second end, a hollow body, a cap, said inner tube being dimensioned and configured to slide within said housing, the second end of said inner tube having an external flange projecting outwardly from said second end of said inner tube, said body of said inner tube having at least one opening defined therein, said inner tube being adapted for receiving a wick means for releasing a scent from the hollow body of said inner tube; and fastening means for releasably securing said inner tube to said housing with said inner tube being disposed within said housing, defining a closed position;

said flange being supported between said pair of annular lips when said device is in an extended position.

2. The device according to claim 1, wherein said housing and said inner tube are elongated cylinders.

3. The device according to claim 1, wherein said second end of said housing is conically shaped, and thus adapted for penetrating a ground surface.

4. The device according to claim 1, wherein said cap is configured to provide an airtight seal, and also has a rectangular tab with an aperture.

5. The device according to claim 1, wherein said housing and said inner tube are made from a thermoplastic material selected from the group consisting of polyethylene and polypropylene.

6. The device according to claim 1, wherein said fastening means comprises external threads disposed at the second end of said inner tube and internal threads disposed at the first end of said housing.

7. The device according to claim 1, wherein a first attaching means comprises a loop made from a flexible member, the loop being attached to the aperture in said cap.

8. The device according to claim 7, further comprising a second attaching means attached to an unattached end of the loop for attaching the device to clothing.

9. The device according to claim 8, wherein said second attaching means comprises an alligator clip attached to said loop.

* * * * *